Aug. 7, 1962 D. L. DRUKEY 3,048,664
COMPENSATION NETWORK
Filed Oct. 7, 1957 2 Sheets-Sheet 1

Donald L. Drukey
INVENTOR.

BY Albert Rosen
Morris Spector
ATTORNEYS

Aug. 7, 1962 D. L. DRUKEY 3,048,664

COMPENSATION NETWORK

Filed Oct. 7, 1957 2 Sheets-Sheet 2

Donald L. Drukey
INVENTOR.

BY Albert Rosen
Morris Spector
ATTORNEYS

United States Patent Office 3,048,664
Patented Aug. 7, 1962

3,048,664

COMPENSATION NETWORK

Donald L. Drukey, Manhattan Beach, Calif., assignor, by mesne assignments, to Thompson Ramo Wooldridge Inc., Cleveland, Ohio, a corporation of Ohio Filed Oct. 7, 1957, Ser. No. 688,515
8 Claims. (Cl. 179—100.2)

This invention relates to compensation networks and more particularly to compensation networks useful in the recording art in correcting for amplitude and phase distortion. While not limited thereto, the invention is herein described as exemplified in a magnetic tape transducer such as a conventional tape recorder.

It is well known that when a signal is magnetically recorded on tape, and subsequently played back, the signal produced by the playback or reading head will not display the same wave shape as that applied to the recording or writing head. Various types of correction devices have been employed in attempts to operate upon a signal prior to recording and/or after playback of the signal so that the signal eventually obtained as an output will substantially duplicate the waveform of the input signal to the recording head. While some of these previous devices have made it possible to obtain a substantially uniform amplitude response over a comparatively wide band of frequencies, they have not proven entirely satisfactory.

The previous compensation devices used to maintain the signal amplitudes of magnetic tape recorders at fairly constant values have generally failed to correct for phase distortion present in the recorders. Indeed, these corrective devices have often increased the amount of phase distortion over the compensated frequency band. While the effects of phase distortion are usually not important in the recording (and playing back) audio signals, since this type of distortion is not thought to produce an effect that is audible to the human ear, phase distortion does introduce an error that is of great importance in the recording (and playing back) of data. In data recording it is frequently desirable to record with a minimum of amplitude distortion as well as with a minimum of phase distortion, and at a relatively low tape speed.

The present invention provides a compensation network that allows a magnetic tape recorder to record and play back signals with high fidelity at higher frequencies than conventionally compensated tape recorders, without any increase in tape speed, and with low phase distortion over most of the frequency band recorded. In the recording of audio signals, where high fidelity is required, the network of the invention makes it possible to record the signals with the same fidelity and over the same frequency range as conventional tape recorders but at lower tape speeds.

It is, therefore, one object of this invention to provide an improved and economical compensation network useful in the recording art, and one which will make it possible to record and play back high frequency signals at conventional recording and playback speeds with relatively low distortion.

It is another object of this invention to provide an improved compensation network for a magnetic tape transducer which will achieve both amplitude and phase compensation over a broad frequency band.

It is still another object of this invention to provide an improved compensation network for a magnetic tape transducer which will compensate for both amplitude and phase distortion, and which will provide this compensation at relatively low tape speeds.

The foregoing and related objects are realized in a compensation network which includes a feedback loop, the loop comprising a difference amplifier or circuit and a delay line. An output signal from the compensation network is split into two portions; one portion is fed directly into the difference circuit and the other portion is fed through the delay line and then into the difference circuit. The resultant signal from the difference circuit is fed back ot the input of the compensation network.

In one embodiment the compensation network is used in a conventional direct recording type magnetic tape recorder, that is, a tape recorder in which an input signal to a recording head causes a proportional magnetization of the tape. The compensation network of the invention is connected in series with either the recording or the playback circuit of the recorder. This compensation network has a transfer function or compensation characteristic which is substantially equal to $$\frac{G}{1+G\left(1-e^{\frac{-x}{v}\frac{d}{dt}}\right)}$$

where G is the over-all maximum loop gain of the compensation network, $e$ is the Napierian logarithm base, $x$ is the effective gap in the playback head, $v$ is the speed of the recording tape on recording or playback (depending on whether the network is used, respectively, in the recording or playback circuit), and the transfer function is defined as that operator which acts on the input signal to produce the observed output signal. Such a compensation network may, for example, incorporate the feedback loop aforementioned. In such a case the signal from the feedback loop is connected to the input of the compensation network by means of a second difference circuit, the feedback look and uncompensated signal input providing the inputs to the second difference circuit, and the delay line is chosen such that it provides a time delay of $$\frac{x}{v}$$

In the two sheets of drawings, wherein like reference characters refer to like parts:

The requirement for compensation in a magnetic tape recorder (that is, in recording and playback apparatus), arises from the fact that the signal generated by the playback head of the recorder does not reproduce the signal which was applied to the recording head. The purpose of the compensation network or circuit of the invention is to modify the signal within the recorder before, after, or partly before and partly after the signal is recorded or played back, so that the signal produced from the recorder closely approximates the signal which was originally fed into the recorder.

Figure 1:
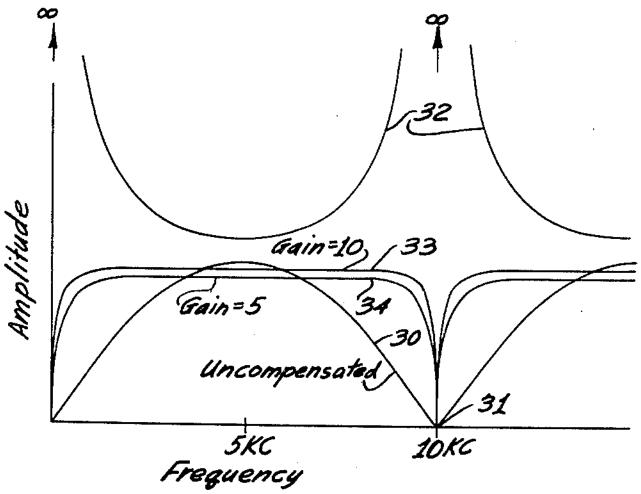
FIGURE 1 is a graphic representation of the amplitude response of an uncompensated signal and of a signal subjected to the amplitude compensation provided by the network of the invention, amplitude being plotted as a function of frequency.

FIGURE 1 graphically illustrates an effect of the compensation network or circuit of the invention. Graph line 30 depicts the amplitude response, as a function of frequency, of the output of one conventional, uncompensated, direct recording type tape recorder of a kind having a cut off frequency (i.e., a first frequency null 31) at about 10 kc. The ratio of the playback voltage to recording current in an uncompensated output is thus seen to be a function of the frequency of the impressed signal. One sees that this ratio is zero at zero frequency, rises to a maximum, and then again returns to zero. The pattern is then repeated. The frequency at which the first null 31 occurs is determined by the effective gap width of the playback head and the velocity of the tape.

In order to compensate for the non-uniform characteristics indicated by graph line 30, one would need a compensating circuit having the performance or correcting characteristic indicated by graph line 32. The compensating network described herein represents an approach to this ideal network. Graph lines 33 and 34 represent, respectively, the amplitude responses of two compensation networks to be described when applied to a tape recorder having the uncompensated response indicated by graph line 30.

In order to understand why the compensation network of the present invention provides the foregoing advantages in the magnetic tape recording art, it is necessary to explain the nature of the distortion introduced in recording on and in playing back magnetic tape. With direct recording magnetic tape transducers or recorders presently known to the art, a recording head operated at reasonable recording levels and with a correct amount of supersonic bias will magnetize a tape in proportion to the current through the recording head. This recording head current, by means of feedback techniques if necessary, may be made directly proportional to the input voltage applied to the recording head at the instant the tape leaves the head. It is thus possible to reproduce the wave form of the input voltage by a magnetization pattern on the tape.

The playback head usually involves a magnetic circuit having a gap therein, and, when the magnetization pattern passes the gap, this head produces a voltage proportional to the time derivative of the flux linking the head. The linkage flux, in turn, is very nearly equal to the integral of the tape magnetization across the effective gap of the playback head, neglecting certain low frequency effects which need not be considered here. The foregoing can be expressed mathematically in the following equation:

(1) $$V_0=K\frac{d}{dt}\int_0^x M(y)dy;$$

where $V_0$=the output voltage of the playback head,
$K$=a proportionality constant,
$x$=the width of the effective gap in the playback head, and
$M(y)$=the magnetization of the tape.

The integration is performed from zero to $x$, zero being one edge of the playback head gap arbitrarily chosen as a reference point.

Remembering that the magnetization of the tape is proportional to the input voltage to be recorded, one can see that the output voltage, $V_0$, is related to the input voltage to be recorded through the following expression:

(2) $$V_0=K'\frac{d}{dt}\int_0^{\frac{x}{v}} V_i(t+\tau)d\tau;$$

$K'$=a proportionality constant including K of Equation 1, where $V_i$=the input voltage to be recorded,
$v$=the tape speed,
$t$=time, and
$\tau$=the equivalent time displacement due to the geometric arrangement of the integration point.

By means of the following Fourier transformation equation, (3) $$V_i(t)=\frac{1}{2\pi}\int_{-\infty}^{\infty} A_\omega e^{i\omega t}d\omega$$

where $A_\omega$=the $\omega$ component of $V_i$, we can derive the following equation:

(4) $$V_i(t+\tau)=e^{\tau\frac{d}{dt}}V_i(t)$$

Substituting Equation 4 into Equation 2, we obtain the following:

(5) $$V_0=\left(K\frac{d}{dt}\int_0^{\frac{x}{v}} e^{\tau\frac{d}{dt}}d\tau\right)V_i$$

and performing the integration operation indicated in Equation 5, we can derive the following equation:

(6) $$V_0=K'\left(e^{\frac{x}{v}\frac{d}{dt}}-1\right)V_i=K'\left(1-e^{\frac{-x}{v}\frac{d}{dt}}\right)e^{\frac{x}{v}\frac{d}{dt}}V_i$$

In Equation 6 the exponential expression outside of the brackets represents a pure advance in time resulting from the choice of an edge of the playback head gap as a reference point for computation purposes; consequently this element can be eliminated, and the transfer function for the over-all tape recording and playback process will be equal to:

(7) $$\frac{V_0}{V_i}=1-e^{\frac{-x}{v}\frac{d}{dt}}$$

If we could find a network having the following transfer function:

(8) $$\frac{F}{A}=\frac{G}{1+G\left(1-e^{\frac{-x}{v}\frac{d}{dt}}\right)}$$

where $F$=the output signal of the circuit,
$A$=the input signal to the circuit, and
$G$=the over-all gain of the circuit, and if such a network were to be placed in series with either the input or the output signal of a tape recorder, it would result in an over-all transfer function which would be derived by multiplying Equations 7 and 8 together to obtain:

(9) Over-all Transfer Function $$\frac{1}{1+\frac{1}{G\left(1-e^{\frac{-x}{v}\frac{d}{dt}}\right)}}$$

The advantages of a magnetic tape recorder having a transfer function substantially equal to that of Equation 9 will be discussed in connection with FIGURES 1 and 3, after a discussion of the circuit of FIGURE 2 which makes it possible to realize this transfer function.

The network transfer function of Equation 8 may be written in the more general form,

(10) $$\frac{G}{1+G\left(1-e^{-\tau\frac{d}{dt}}\right)}$$

since the time displacement $$\frac{x}{v}$$

may be represented generally by $\tau$.

Figure 2:
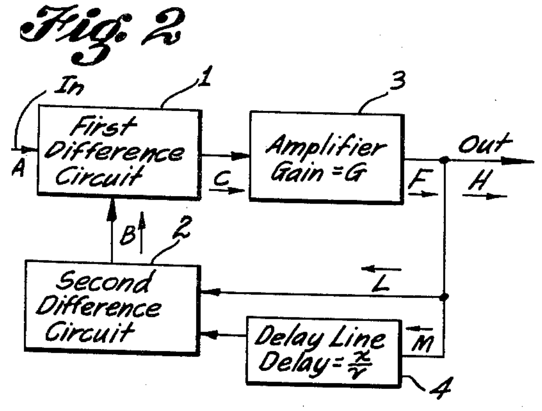
FIGURE 2 is a block diagram depicting the essential elements of a compensation network according to the invention.

Referring now to FIGURE 2, there is shown a block diagram of a compensation network having a transfer function substantially equal to that defined by Equation 8. In this figure there is illustrated a pair of subtraction type arithmetic amplifiers or difference circuits 1 and 2. Each of the difference circuits is receptive of two inputs and provides an output equal to the difference between its two inputs. Such difference type arithmetic circuits are known in the art, a number of such circuits being shown in volume 18 of the Massachusetts Institute of Technology, Radiation Laboratory Series, published in 1948 by the McGraw-Hill Book Company, Inc., and entitled, Vacuum Tube Amplifiers, by Valley and Wallman, pp.

441–451. Since the invention does not depend upon any particular kind of difference circuit, such arithmetic circuits will not be further described here.

Two input signals A and B are fed into the first difference circuit 1, input signal A being an input signal into the compensation network and input signal B being the output signal from the second difference circuit 2. The first difference circuit 1 has an output signal C, which is equal to the difference between the input signals A and B. The output signal C is fed through an amplifier 3 having a gain of G and producing an output signal F. The amplifier 3 may be any one of numerous amplifiers well known in the art or, if the difference circuits 1 and 2 amplify the inputs thereto, the amplifier 3 may be considered as a symbolic amplifier with a gain G equal to the over-all gain of the entire compensation network shown in this figure. By over-all gain there is meant the open circuit gain, that is the gain of the compensation circuit at the frequency of the first signal null 31. If the difference circuits 1 and 2 are such that they provide the desired amount of gain, then no separate amplifier is necessary.

One part H of the output signal F from the amplifier 3 flows out of the compensation network for use in an appropriate utilization device and another part J of the output signal F is split into two portions L and M. One of the portions L is fed directly back to the second difference circuit 2 as one input signal thereto, and the other portion M of the output signal F is fed to the second difference circuit 2 through a delay circuit or line 4 to provide the other input signal to the second difference circuit 2. The delay line 4 is designed to delay the energy through it for a time equal to $$\frac{x}{v}$$

these quantities being earlier defined. The delay circuit 4 may be any suitable one of the delay lines known in the art and may, for example, be any one of the suitable delay lines shown in chapter 6 of volume 17 of the Massachusetts Institute of Technology, Radiation Laboratory Series, entitled, Components Handbook, by Blackburn, published in 1949 by the McGraw-Hill Book Company, Inc. Since the invention does not depend upon any particular form of delay, no special type of delay line is discussed here.

The signal passing through the delay circuit 4 to the second difference circuit 2 is equal to $$\left(e^{\frac{-x}{v}\frac{d}{dt}}\right)F$$

Examining FIGURE 2, it will be apparent that the following relations are true:

$$F=GC \tag{11}$$

$$B=F-\left(e^{\frac{-x}{v}\frac{d}{dt}}\right)F \tag{12}$$

$$A-B=C \tag{13}$$

Solving the Equations 11, 12, and 13 for $$\frac{F}{A}$$

which is the transfer function of this circuit, it will be apparent that $$\frac{F}{A}$$

is equal to Equation 8. Therefore, the circuit of FIGURE 2, when connected in series with the signal to be recorded on a magnetic tape, or in series with the signal played back from the magnetic tape, will provide an over-all transfer function equal to Equation 9.

Examining Equation 9 it will be seen that when the over-all gain of G of the circuit is large, the transfer function is substantially equal to unity over most of the frequency range. While in theory as large a gain as possible is desired, the limiting factor in gain is a tendency toward oscillation due to departures from the ideal in the delay line and other circuit elements. A compensation circuit with an over-all gain G of 10 has been demonstrate to be very stable. However, analysis has indicated that, with sufficient care in circuit design, substantially higher gains may be used.

The graph line 33 aforementioned (FIGURE 1) is a plot of the real portion of Equation 9, which is the amplitude response of the over-all network or circuit plotted against frequency. The over-all gain G was taken as equal to ten. It is seen that the amplitude response of a tape recorder utilizing the compensation circuit of FIGURE 2 is flat over about 90% of the cutoff frequency. Moreover, after the cutoff frequency at the first null 31, the amplitude response is again flat. There is also illustrated in the same graph, by graph line 34, a compensation circuit wherein the over-all gain G is equal to 5. It is seen that while the lower gain circuit provides substantial amplitude compensation, the flatness of the frequency response increases with increasing compensation circuit gain.

Figure 3:
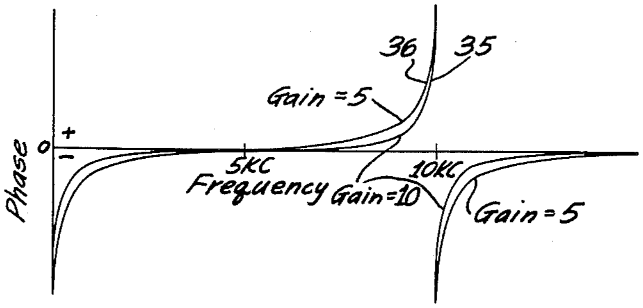
FIGURE 3 is a graphic representation of the phase compensation provided by the network of the invention, phase being plotted as a function of frequency.

Referring now to FIGURE 3, a graph line 35 depicts an imaginary portion of Equation 9, this graph constituting a plot of phase versus frequency for a network having a gain of 10. This figure shows that with the use of a compensation network according to the invention and having a gain of 10 the phase characteristics for the over-all circuit are compensated out to at least 90% of the cutoff frequency, and well beyond the cutoff frequency. As illustrated by graph line 36, the phase characteristics are compensated out to a substantial portion of the frequency range of the signal even at the substantially lower over-all gain of 5.

Thus, is will be apparent that the over-all phase and amplitude characteristics for the compensation network shown in FIGURE 2, when the network is incorporated into a tape recording system and has a gain of at least ten, is excellent out to at least 90% of the cutoff frequency. Moreover, with the use of the invention compensation can be provided beyond the cut-off frequency in the recording of data.

Figure 4:
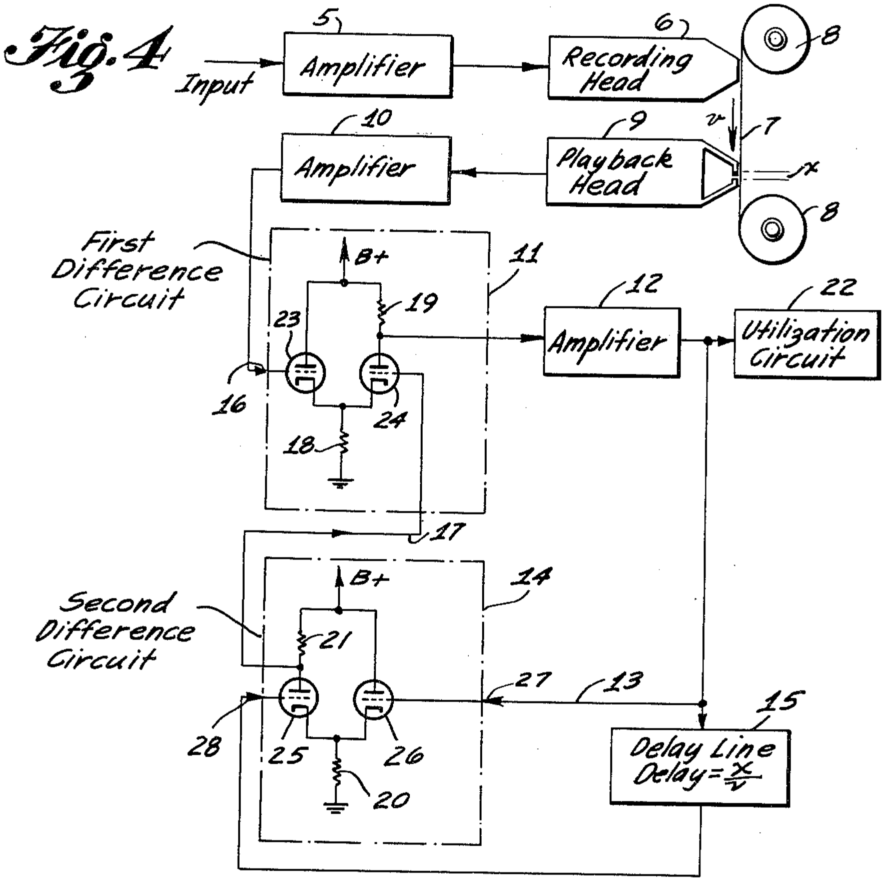
FIGURE 4 is a circuit diagram showing one embodiment of the invention.

FIGURE 4 illustrates an embodiment of the compensation circuit network of the invention as incorporated in a conventional direct recording type tape recorder. As will be seen from this figure, a signal input which it is desired to record on magnetic tape, and later play back, is applied through a first amplifier 5 to a recording or writing head 6, this head being disposed closely adjacent to magnetic tape 7. The tape 7 is carried on a pair of reels 8 and is supported for movement with a velocity $v$ (in the direction indicated by letter $v$) adjacent to and in signal transfer relation with, successively, the writing head 6 and a playback or reading head 9. As the recording tape 7 passes adjacent to the writing head 6, it has impressed thereon a magnetic signal which is proportional to the signal input. The recorded signal is then read by the reading head 9, here shown as a magnet having an effective gap equal to $x$ (by reading or playback head gap width there is meant the effective width of the gap in the playback head). Due to the fact that not all of the magnetic flux lines across the gap originate from the portions of the head defining the gap, the actual width of the gap is generally smaller than the effective width of the gap. The magnetization pattern on the magnetic tape 7, in passing through the gap $x$, generates an electrical signal which is fed from this head 9 to a second or reading head amplifier 10. While the magnetic tape 7 is here depicted as passing both the writing and reading heads during a single travel of the tape, it will be appreciated that the tape may instead have separate writing and reading paths, and with the velocity of the tape different in the separate paths. In such a case the velocity $v$ referred to in Equation 9 is the velocity of the tape through the writing or reading head to which the compensation circuit is connected. No further description of any of the above named elements in FIGURE 4 is believed to be necessary at this time since such tape recorders are well known in the art.

In accordance with the invention, the remainder of FIGURE 4 discloses a particular compensation circuit disposed in series with the output from the reading head amplifier 10 and compensating for the amplitude and phase distortions introduced by the reading head 9. It should be re-emphasized at this point that the compensation circuit now to be described may be connected in series with writing head 6, in series with the reading head 9, or one portion of the compensation circuit may be connected in series with the writing head and another portion connected in series with the reading head, and without affecting the beneficial results obtained from the invention.

The first element in the compensation circuit of the invention is a first differential amplifier or difference circuit 11 which is adapted to receive a pair of input signals through a pair of inputs 16 and 17, subtract the signals from each other and provide an output signal proportional to the difference between the input signals. The first input 16 to the difference circuit 11 is connected to the output from the reading head amplifier 10. The output from the first difference circuit 11 is then fed through an amplifier 12, the amplifier having a gain equal to G, and to a utilization circuit 22, as shown. This utilization circuit 22 may be an audio amplifier-speaker combination, a cathode ray oscilloscope, or any other desired utilization circuit. Part of the output from the amplifier 12 is fed through a lead 13 to a first input 27 of a second difference circuit 14 similar to the first difference circuit 11. A second input 28 to the second difference circuit 14 is provided by the output from a delay line 15, this delay line also being connected to the output from amplifier 12 and delaying the portion of the output passing through the line for a time equal to $$\frac{x}{v}$$

where $x$ is the effective gap of the reading head 9 and $v$ is the velocity of the tape 7 relative to the reading head. The output from the second difference circuit 14 is connected to the second input 17 of the first difference circuit 11. The particular difference circuits 11 and 14 used in this circuit are shown on page 442 of volume 18 of the aforementioned Radiation Laboratory Series. The first difference circuit 11 comprises a pair of triode vacuum tubes 23 and 24 with their cathodes connected together and coupled to ground through a resistor 18, the anode of one tube 24 being connected through a resistor 19 to the anode of the other tube 23 and to a source of B+ voltage (not shown). The inputs 16 and 17 to this first difference circuit 11 are applied to the respective grids of these two tubes and the output is taken from the anode resistor 19 and is applied to the amplifier 12. The second difference circuit 14 operates in the same manner as the first difference circuit 11, the tubes of the second difference circuit being indicated by numerals 25 and 26, and the cathode and anode resistors of this second circuit being respectively numbered 20 and 21. The particular difference circuits used in this compensation circuit are not significant since many such difference circuits are known to the art; therefore, no further description of these difference circuits is deemed to be necessary, it only being required that any such difference circuit must provide as an output the difference between the inputs applied thereto.

The delay line 15, as explained above with respect to the delay line 4 of FIGURE 2, may comprise any of the well known electromagnetic delay lines. If a passive delay line is used as the delay line 15 of the compensation circuit, there will be losses in such a line, the losses leading to an attenuation of the signal applied to the second input 28 of the second difference circuit. These losses are preferably equalized as by means of an attenuator (not shown) connected in series with the first input 27 to the second difference circuit. The attenuation provided by the attenuator in series with the first input 27 should equal the attenuation provided by the delay line 15.

In one embodiment actually built and tested the reading head 9 had an effective gap $x$ of 0.75 mils, the tape velocity $v$ was 7.5 inches per second, and the delay line 15 was a 5-section delay line of the type shown on page 210 of volume 17 of the aforementioned Radiation Laboratory Series and provided a delay of 100 microseconds. The triode vacuum tubes 23 to 26 that were actually used were type 6 AS7's with 250 ohm resistors 18 and 20 in their cathode circuits and 1000 ohm resistors 19 and 21 in their anode circuits, the B+ voltage was equal to 260 volts, and each differenc circuit 11 and 14 provided a gain of approximately one. With these difference circuits alone the gain of the over-all circuit was less than ten; therefore, an amplifier 12 with a gain of ten was provided.

With the circuit set forth above it was found possible to record and reproduce input signals of from about 50 to 17,000 cycles with a variation of less than ±2 db and without increasing the speed of the tape beyond 7.5 inches per second. Moreover, the foregoing was accomplished with only negligible phase distortion.

It should be understood that the present invention is not limited to any particular kinds of difference circuits, delay lines, amplifiers, or attenuators, since it is necessary only that Equation 9 be satisfied for the invention to operate.

Figure 5:
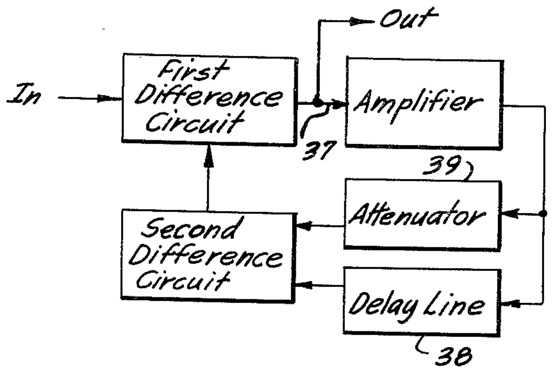
FIGURE 5 is a block diagram illustrating another form of compensation network according to the invention.

The compensation circuit of the invention has been described and illustrated with respect to an arrangement wherein the output from the circuit is taken directly from the output of the amplifier. However, the output from the compensation circuit may instead be taken from other points in the circuit. For example, FIGURE 5 illustrates a compensation circuit similar to the one shown in FIGURES 2 and 4, but wherein the output from the circuit is taken from the input 37 to the amplifier. In the compensation circuit of FIGURE 5 the delay line 38 is of the lumped parameter type. Therefore, an attenuator 39 is used to assure that the input signals to the second difference circuit will have the same amplitude as those to the first difference circuit.

While the compensation circuit of the invention has been described as used in an application where the entire frequency range of a signal is subjected to correction, the circuit of the invention is also useful in producing correction in a portion only of the frequency range of the subject signal. For example, if the signal to be corrected were subjected to pre-emphasis over a frequency range of substantially zero to 5 kc., such that the amplitude response of the signal was substantially flat to 5 kc., then the compensation circuit of the invention would be used together with a 5 kc. low cut-off filter so that correction would be provided only for frequencies above 5 kc.

From the foregoing it is apparent that a compensation circuit or network has been disclosed which finds especial utility in recording and reproducing signals over a wide frequency range at low recording and playback speeds with negligible amplitude and phase distortion.

What is claimed is:

1. In combination with magnetic transducing means having reproducing head means with an effective gap equal to $x$, having magnetic recording means movable at a velocity $v$ with respect to said gap, and having a transfer function substantially equal to $$1-e^{\frac{-x}{v}\frac{d}{dt}}$$

where $e$ is the Napierian logarithm base and $d/dt$ is the derivative operator; a compensation network comprising: first and second difference means each adapted to receive a pair of input signals thereto and to provide a respective output proportional to the difference between its input signals, said first difference means being connected to receive as one input signal thereto a signal from said magnetic transducing means; means connecting the output of said first difference means to said second difference means; and delay means, providing a delay substantially equal to $$\frac{x}{v}$$

also connected between the output from said first difference means and said second difference means, the output from said second difference means being connected to said first difference means.

2. In combination with magnetic recorder means having reproducing head means with an effective air gap equal to $x$, having a magnetic recording medium movable at a speed $v$ with respect to said gap and closely adjacent thereto, and having a transfer function substantially equal to $$1-e^{\frac{-x}{v}\frac{d}{dt}}$$

where $e$ is the Napierian logarithm base and $d/dt$ is the derivative operator; a compensation network comprising: first and second difference means each of which is adapted to receive a pair of input signals thereto and to provide a respective output proportional to the difference between its input signals, said first difference means being connected to receive as one input signal thereto a signal from said magnetic recorder means; means connecting the output of said first difference means to said second difference means for feeding a portion of said first difference means output into said second difference means; and delay means also connected between said output of said first difference means and said second difference means for delaying the passage of part of said first difference means output to said second difference means for a time equal to $x/v$, the output from said second difference means being connected to said first difference means, the over-all gain of said compensation network being at least 10.

3. In combination with magnetic tape transducing means having reproducing head means with an effective gap equal to $x$, having magnetic tape means movable at a velocity $v$ with respect to said gap and closely adjacent thereto, and having a transfer function substantially equal to $$1-e^{\frac{-x}{v}\frac{d}{dt}}$$

where $e$ is the Napierian logarithm base and $d/dt$ is the derivative operator; a compensation network comprising: first and second difference circuit means each adapted to receive a pair of input signals thereto and to provide a respective output proportional to the difference between its input signals, said first difference circuit means being connected to receive as one input signal thereto a signal from said magnetic tape transducing means; amplifier means connected directly to the output of said first difference circuit means for first amplifying this output and then feeding a portion of it into said second difference circuit means; and delay means connected between said amplifier means and said second difference circuit means for delaying the passage of part of said amplifier means output to said second difference circuit means for a time equal to $x/v$, the output from said second difference circuit means being connected to said first difference circuit means.

4. The combination claimed in claim 3, wherein the direct connection between said amplifier means and said output of said first difference circuit means includes attenuation means adapted to reduce the amplitude of a signal passing through said direct connection to the same order of amplitude as that of a signal passing to said first difference circuit output through said delay line.

5. For use in combination with a magnetic recorder of the type having a transfer function productive of a signal including a phase distortion error caused by a determinable fixed delay, a compensation network comprising: a first circuit receptive of the error containing signal and connectable to receive a second signal, said first circuit being connected to combine the error containing signal and the second signal to provide an output having substantially no phase distortion error when the second signal is substantially equal to the error; a delay means for producing a delay substantially equal to the determinable fixed delay; said delay means having one end connected to receive said output of the first circuit; a second circuit receptive of said output of said first circuit and connected to the other end of the delay means, the second circuit providing a phase distortion error signal output substantially equal to the error created by the delay means; and electric circuit means for connecting the phase distortion error signal from the second circuit to the first circuit as the second input thereto.

6. In combination with a signal source of the type having a transfer function productive of a data signal including a phase distortion error caused by a determinable fixed delay, a compensation network comprising: a first circuit receptive of the error containing data signal and a compensation signal for generating an output data signal containing substantially no phase distortion; a delay means for providing a delay substantially equal to a determinable fixed delay, said delay means being receptive of the output data signal to provide another data signal having substantially the same phase distortion error as that of the signal source; a second circuit receptive of the output data signal and of the another data signal to provide a compensation signal; and electric circuit means for connecting the compensation signal from the second circuit to the first circuit.

7. In combination with a network generating a data signal subject to phase distortion error because of a particular time duration delay, a compensation network comprising: a first difference circuit adapted to receive a pair of input signals for providing an output proportional to the difference between its inputs; first electric circuit means connecting the error containing data signal to one input of the first difference circuit; second electric circuit means for connecting the output of the first difference circuit to a utilization circuit; a delay means having a transfer function in accordance with the phase distortion error; a second difference circuit connected to receive a pair of input signals for providing an output proportional to the difference between its inputs; third electric circuit means connecting the output of the first difference circuit to one input of the second difference circuit; fourth electric circuit means connecting the delay means between the output of the first difference circuit and the other input of the second difference circuit; and fifth electric circuit means connecting the output of the second difference circuit to the other input of the first difference circuit.

8. A compensation network defined in claim 7 wherein said network has a transfer function substantially equal to $$\frac{G}{1+G\left(1-e^{-\tau\frac{d}{dt}}\right)}$$

where $e$ is the Napierian logarithm base, $\tau$ is a time delay characteristic of the distortion error, $d/dt$ is the derivative operator, and G is the overall gain of the compensation network.

References Cited in the file of this patent

UNITED STATES PATENTS

| | | |
|---|---|---|
| 2,657,276 | Eliot et al. | Oct. 27, 1933 |
| 2,685,079 | Hoeppner | July 27, 1954 |
| 2,807,797 | Shoemaker | Sept. 24, 1957 |
| 2,937,239 | Garber et al. | May 17, 1960 |

OTHER REFERENCES

Proceedings of the Eastern Joint Computer Conference, Dec. 8–10, 1954, pages 16–21.

UNITED STATES PATENT OFFICE
CERTIFICATE OF CORRECTION

Patent No. 3,048,664 August 7, 1962

Donald L. Drukey

It is hereby certified that error appears in the above numbered patent requiring correction and that the said Letters Patent should read as corrected below.

Column 4, equation "(5)" about line 10, after "K" insert a prime; column 6, lines 5 and 6, for "demonstrate" read -- demonstrated --; line 36, for "is" read -- it --; column 8, line 15, for "differenc" read -- difference --.

Signed and sealed this 25th day of December 1962.

(SEAL)
Attest:

ERNEST W. SWIDER
Attesting Officer

DAVID L. LADD
Commissioner of Patents